United States Patent
Jennings et al.

(10) Patent No.: US 7,666,951 B2
(45) Date of Patent: Feb. 23, 2010

(54) COATING COMPOSITIONS THAT INCLUDE A POLYESTER POLYOL, RELATED COATED SUBSTRATES, MULTI-LAYER COATING AND METHODS

(75) Inventors: Robert E. Jennings, Ellwood City, PA (US); Bruce A. Connelly, Gibsonia, PA (US); Jonathan T. Martz, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 814 days.

(21) Appl. No.: 11/065,216

(22) Filed: Feb. 24, 2005

(65) Prior Publication Data

US 2006/0188738 A1    Aug. 24, 2006

(51) Int. Cl.
    *C08L 67/00* (2006.01)
(52) U.S. Cl. .................. 525/438; 525/418; 528/272
(58) Field of Classification Search ............. 525/438, 525/418; 528/272
    See application file for complete search history.

(56) References Cited

U.S. PATENT DOCUMENTS

| | | | | |
|---|---|---|---|---|
| 3,844,998 | A | 10/1974 | Jeffery et al. | 260/29.4 R |
| 4,351,928 | A | 9/1982 | Smith | 525/443 |
| 4,606,947 | A | 8/1986 | Heinrich et al. | 427/388.1 |
| 4,812,174 | A * | 3/1989 | Kimura | 148/251 |
| 4,918,156 | A * | 4/1990 | Rogers | 528/272 |
| 5,166,289 | A | 11/1992 | Yezielev et al. | 525/443 |
| 5,229,210 | A | 7/1993 | Kasukawa et al. | 428/416 |
| 5,705,567 | A | 1/1998 | Iwamura et al. | 525/127 |
| 5,705,595 | A | 1/1998 | Oda et al. | 528/71 |
| 6,306,956 | B1 | 10/2001 | Spilman et al. | 524/601 |
| 6,350,809 | B1 * | 2/2002 | Goebel et al. | 524/509 |
| 6,559,265 | B2 | 5/2003 | Lamers et al. | 528/45 |
| 6,620,511 | B1 | 9/2003 | Wigger et al. | 428/413 |
| 2003/0105244 | A1 | 6/2003 | Sato et al. | 525/438 |
| 2003/0176592 | A1 * | 9/2003 | Swarup et al. | 525/419 |

FOREIGN PATENT DOCUMENTS

| | | | |
|---|---|---|---|
| DE | 2013702 | | 10/1971 |
| DE | 103 10 446 A1 | | 9/2004 |
| DE | 10310446 A1 | * | 9/2004 |
| EP | 0411690 A1 | | 2/1991 |
| EP | 0673983 A1 | | 9/1995 |
| EP | 1178091 A2 | | 2/2002 |
| EP | 1411072 A2 | | 4/2004 |
| EP | 1454971 A1 | | 9/2004 |
| GB | 2252558 A | | 8/1992 |
| JP | 57139155 A | * | 8/1982 |
| JP | 6306330 | | 11/1994 |
| JP | 1997157589 A | | 6/1997 |
| JP | 9241580 | | 9/1997 |
| WO | WO 03/022946 A1 | | 3/2003 |

OTHER PUBLICATIONS

English translation of JP 57139155 A.*
English translation of Abstract of JP 57139155A.*
English translation of abstract of JP 57139155A.*

* cited by examiner

*Primary Examiner*—Randy Gulakowski
*Assistant Examiner*—Alicia M Toscano
(74) *Attorney, Agent, or Firm*—Donald R. Palladino

(57) ABSTRACT

Coating compositions are disclosed comprising a polyester comprising at least two reactive hydroxyl groups, a material comprising at least two functional groups reactive with the hydroxyl groups of the polyester, and a free acid. Methods of using the coatings, methods for refinishing an article with the coatings, and the substrates coated therewith, are also disclosed.

10 Claims, No Drawings

COATING COMPOSITIONS THAT INCLUDE A POLYESTER POLYOL, RELATED COATED SUBSTRATES, MULTI-LAYER COATING AND METHODS

FIELD OF THE INVENTION

The present invention relates to coating compositions comprising a polyester comprising at least two reactive hydroxyl groups, a material comprising at least two functional groups reactive with the hydroxyl groups of the polyester, and a free acid. In certain embodiments, the polyester comprises a reaction product of reactants comprising (i) a polycarboxylic acid comprising more than two acid groups per molecule and (ii) a hydroxyl-containing compound comprising no more than two hydroxyl groups per molecule. The present invention is also directed to multi-layer coatings comprising a coating layer deposited from such compositions, methods for coating substrates with such compositions, and substrates at least partially coated with such compositions. In addition, the present invention is directed to methods for refinishing the surface of an article.

BACKGROUND OF THE INVENTION

In the automotive industry, it is desirable to extend the life of vehicle bodies by protecting them from, for example, the abrasive chipping action of road dirt and debris, such as sand and gravel, that may cause an aesthetically unpleasing chipping of the vehicle body surface, which may also lead to rusting. Often, coating compositions designed to aid in various properties, such as corrosion resistance and chip resistance are employed to protect against such damage. Thus, coating compositions, such as primer compositions, have been developed that have desirable chip resistance and/or corrosion resistance properties. Such chip resistant primer compositions may be placed directly upon a metal substrate or between an electrodeposited primer layer, which is directly upon the metal substrate, and an outer topcoat layer.

In the automotive refinish industry, several steps are often involved in repairing defects in the original coating. For example, such a repair can involve sanding or grinding out the defect by mechanical means, or completely stripping the whole part or vehicle of its original coating layers, often resulting in exposure of the bare metal substrate. The sanded area of exposed bare metal is then covered with a corrosion inhibitive primer composition, that is, a primer composition formulated with corrosion inhibitive pigments, such as strontium chromate, zinc phosphate, and derivatives of zinc phosphate, and which also adheres to both bare metal substrate and subsequently applied organic coatings. Next, a sandable primer-surfacer composition is often applied. Then, a primer, often referred to as a sealer, is applied, which improves adhesion of topcoats to the undercoated area, and also often improves the surface properties, such as chip resistance, of the entire coating system.

As is apparent, such a refinish undercoat application process can be time consuming and expensive due to labor, volatile organic abatement engineering requirements, and time required for drying of each of the applied undercoatings. As a result, it would be desirable to provide a coating composition that can exhibit favorable chip resistance and intercoat adhesion and which may allow for simplified methods of refinishing the surface of an article, such as an automobile body.

SUMMARY OF THE INVENTION

In one respect, the present invention is directed to coating compositions comprising: (a) a polyester comprising at least two reactive hydroxyl groups and comprising the reaction product of reactants comprising (i) a polycarboxylic acid comprising more than two acid groups per molecule and (ii) a hydroxyl-containing compound comprising no more than two hydroxyl groups per molecule; (b) a material comprising at least two functional groups reactive with the hydroxyl groups of the polyester; and (c) a free acid.

In another respect, the present invention is directed to methods of coating a substrate comprising (a) applying a coating composition of the present invention to at least a portion of the substrate; (b) coalescing the composition over the substrate in the form of a substantially continuous film; and (c) curing the composition.

In still another respect, the present invention is directed to multi-layer coatings comprising: (a) a first coating layer deposited from a coating composition of the present invention; (b) a second coating layer deposited over at least a portion of the first coating layer (a); and, (c) a topcoat layer deposited over at least a portion of the second coating layer (b).

In yet another respect, the present invention is directed to methods for refinishing the surface of an article, such as an article having a metal substrate. These methods of the present invention comprise the steps of: (a) removing a defect from the surface; (b) applying a first coating layer deposited from a coating composition of the present invention over at least a portion of the surface; and (c) applying a topcoat layer directly over at least a portion of the first coating layer (b).

The present invention is also directed to coating compositions comprising: (a) a polyester comprising at least two reactive hydroxyl groups; (b) a material comprising at least two functional groups reactive with the hydroxyl groups of the polyester; and (c) a free acid, wherein the polyester is present in the composition in an amount sufficient to result in a coating having improved chip resistance when compared to a coating deposited at similar conditions from a similar coating composition that does not include the polyester.

In yet another respect, the present invention is directed to a coating composition comprising: (a) a polyester comprising at least two reactive hydroxyl groups; (b) a material comprising at least two functional groups reactive with the hydroxyl groups of polyester (a); and (c) a free acid comprising an organic acid.

DESCRIPTION OF EMBODIMENTS OF THE INVENTION

Other than in the operating examples, or where otherwise indicated, all numbers, numerical parameters and/or ranges expressing, for example, quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

It should also be understood that, in this application, use of the singular includes the plural and plural encompasses the singular unless specifically stated otherwise. In this application, the use of "or" means "and/or" unless specifically stated otherwise.

The present invention is directed to coating compositions that comprise (a) a polyester comprising at least two reactive hydroxyl groups; (b) a material comprising at least two functional groups reactive with the hydroxyl groups of the polyester; and (c) a free acid.

As indicated, the compositions of the present invention comprise a polyester comprising at least two reactive hydroxyl groups. As used herein, the term "polyester" refers to those polymers produced from the reaction of a hydroxyl (—OH) containing material with a polycarboxylic acid or an anhydride thereof. As used herein, the term "reactive" refers to a functional group that can form a covalent bond with another functional group under conditions sufficient to cure the composition. As used herein, the term "reactive hydroxyl groups" refers to reactive —OH groups.

In certain embodiments of the present invention, the polyester comprises the reaction product of reactants comprising (i) a polycarboxylic acid comprising more than two acid groups per molecule and (ii) a hydroxyl-containing compound comprising no more than two hydroxyl groups per molecule. As used herein, the term "polycarboxylic acid" is meant to encompass materials comprising at least two carboxylic acid groups, i.e., —COOH groups, per molecule, as well as anhydrides of such materials. Examples of polycarboxylic acids that comprise more than two carboxylic acid groups, which are suitable for use in the present invention, include trimellitic acid, tricarballylic acid, pyromellitic acid, tartaric acid, citric acid, as well as anhydrides thereof or a mixture thereof.

As previously indicated, the polyester used in certain embodiments of the compositions of the present invention is also prepared from a hydroxyl-containing compound comprising no more than two hydroxyl groups per molecule. As used herein, the term "hydroxyl-containing compound" is meant to encompass those materials that comprise at least one hydroxyl group, i.e., —OH group, per molecule. In certain embodiments, the hydroxyl-containing compound comprises two functional groups per molecule, such as a diol. Among the hydroxyl-containing compounds suitable for use in the present invention include, for example, ether glycols, polyether glycols, urethane glycols, polycaprolactone glycols, polyester glycols, polycarbonate glycols, or mixtures thereof. In certain embodiments, the polyester comprises the reaction product of from 1.5 to 2.5 molar equivalents of the hydroxyl-containing compound per one (1) molar equivalent acid or anhydride.

In certain embodiments, the hydroxyl-containing compound comprises a polyether glycol, such as, for example, a polytetramethylene ether glycol, such as that which is available under the tradename TERATHANE®, commercially available from Du Pont® Specialty Chemicals of Wilmington, Del. In certain embodiments, the polytetramethylene ether glycol has a hydroxyl number between 20 and 500, such as between 50 and 500 mg KOH/gram of polymer, as determined by any well-known potentiometric titration technique known in the art. Hydroxyl number, as used herein, is milligrams of potassium hydroxide equivalent to the hydroxyl content of one (1) gram of polymer.

Polyether glycols suitable for use in the present invention include those comprising a structure of formula (I):

$$H-(O-CH_2-(CHR)_n-)_p-OH \qquad (I)$$

wherein R denotes hydrogen or a substituted or unsubstituted alkyl group comprising from 1 to 4 carbon atoms, n denotes an integer having a value ranging from 1 to 5, and p denotes a number having an average value ranging from 1 to 100, such as from 1 to 50. In certain embodiments, structure (I) is polytetramethylene glycol, wherein R denotes hydrogen, n is 3, and p has an average value of up to 20.

The polyesterification reaction used to prepare the polyester may be carried out in accordance with techniques well known to those skilled in the art of polymer chemistry. In certain embodiments, the polyester comprises the reaction product of trimellitic anhydride and polytetramethylene ether glycol. In certain embodiments, the polyester comprises the reaction product of at least 2.5 moles polytetramethylene ether glycol for every 1 mole trimellitic anhydride.

In certain embodiments, the reaction is conducted by combining the ingredients and heating to a temperature of 160° C. to 220° C., which is sometimes referred to as "hot melt" conditions. During the course of the polyesterification, most of the polyester is formed in a temperature range of about 170° C. to about 220° C. The temperature during the entire course of the reaction generally ranges from about 160° C. to about 220° C., however, lower temperatures may be used, particularly when the reaction is conducted at higher pressures. In certain cases, the polyesterification is considered complete when an acid value of no more than 10 mg KOH/gram of the polyester is obtained as determined by any well-known potentiometric titration technique known in the art.

In certain embodiments, one hundred mole percent of the polycarboxylic acid reactant comprises more than two acid groups per molecule, such as, for example, trimellitic acid, trimellitic anhydride, or a mixture thereof. In other embodiments, less than one hundred mole percent, such as more than 45 mole percent of the polycarboxylic acid reactant comprises more than two acid groups per molecule. In these embodiments, the remaining portion of the polycarboxylic acid reactant can include, for example, a dicarboxylic acid.

As used herein, the term "dicarboxylic acid" is meant to encompass materials comprising two carboxylic acid groups, i.e. —COOH groups, per molecule, as well as anhydrides of such materials. Examples of dicarboxylic acids that comprise two carboxylic acid groups per molecule, which are suitable for use in the present invention, include succinic acid, glutaric acid, adipic acid, azelaic acid, terephthalic acid, phthalic acid, isophthalic acid, endomethylenetetrahydrophthalic acid, 1,2-cyclohexanedicarboxylic acid, 1,3-cyclohexanedicarboxylic acid, 1,4-cyclohexanedicarboxylic acid, dodecanedioic acid, dodecanedicarboxylic acid; dimeric and polymeric fatty acids, maleic acid, fumaric acid, itaconic acid, citraconic acid and aconitic acid, as well as anhydrides thereof or a mixture thereof.

In certain embodiments, the polyester included within the coating compositions of the present invention has a hydroxyl number between 25 and 200 mg KOH/gram of polymer, as determined by any well-known potentiometric titration technique known in the art.

In addition to the polyester, certain embodiments of the coating compositions of the present invention further comprise a polymer different from the polyester described above. In certain embodiments, such a polymer comprises functional groups, which, in certain embodiments, are reactive with the functional groups of the material comprising at least two functional groups reactive with the hydroxyl groups of the polyester, which is described in detail below. Specific non-limiting examples of such polymers, which are suitable for use in forming the coating compositions of the present invention, include acrylic polymers, saturated and unsaturated polyesters, polyvinyl, cellulosic, acrylate, silicon-based polymers, polyurethane polymers, polyether polymers, or a mixture thereof. As used herein, the term "polymer" is meant to encompass oligomers, and includes, without limitation, both homopolymers and copolymers.

In certain embodiments, the weight ratio of the polyester to such other polymers that may be present in the composition ranges from 10:90 to 80:20 or, in some cases, 25:75 to 60:40 or, in yet other cases, 40:60 to 50:50.

As previously indicated, the coating compositions of the present invention also comprise a material comprising at least two functional groups reactive with the hydroxyl groups of the polyester. Suitable functional groups include epoxy groups, anhydride groups, isocyanate groups, melamine groups, or mixtures thereof. Suitable materials include polyepoxides, polyanhydrides, polyisocyanates, aminoplasts, or mixtures thereof.

In certain embodiments, the coating composition is crosslinked when the polyester comprises more than two reactive hydroxyl groups or alternatively, when the material of component (b) comprises more than two functional groups.

Examples of polyepoxides suitable for use in the compositions of the present invention include those described in U.S. Pat. No. 4,681,811 at col. 5, lines 33 to 58, hereby incorporated by reference. Examples of anhydrides suitable for use in the compositions of the present invention include those described in U.S. Pat. No. 4,798,746 at col. 10, lines 16 to 50; and in U.S. Pat. No. 4,732,790 at col. 3, lines 41 to 57, both hereby incorporated by reference. Examples of polyisocyanates and blocked isocyanates suitable for use in the compositions of the present invention include those described in U.S. Pat. No. 4,546,045 at col. 5, lines 16 to 38; and in U.S. Pat. No. 5,468,802 at col. 3, lines 48 to 60, both hereby incorporated by reference. Examples of aminoplast and phenoplast resins suitable as curing agents in the curable compositions of the present invention include those described in U.S. Pat. No. 3,919,351 at col. 5, line 22 to col. 6, line 25, hereby incorporated by reference.

In certain embodiments of the present invention, the material comprising at least two functional groups reactive with the hydroxyl groups of the polyester is present such that the molar equivalent of the functional groups ranges from 0.5 to 2.0 per every one (1) molar equivalent of hydroxyl groups present in the composition, such as the hydroxyl groups of the polyester and any hydroxyl groups present in any other composition components.

In addition, as indicated earlier, the coating compositions of the present invention comprise a free acid. As used herein, the term "free acid" is meant to encompass organic and/or inorganic acids that are included as a separate component of the compositions of the present invention as opposed to any acids that are used to form any of the polymers present in the composition. In certain embodiments, the free acid included within the coating compositions of the present invention is selected from tannic acid, gallic acid, phosphoric acid, phosphorous acid, citric acid, malonic acid, or derivatives thereof, or mixtures thereof. Suitable derivatives include esters, amides, and/or metal complexes of such acids.

In certain embodiments, the free acid comprises an organic acid, such as tannic acid, i.e., tannin. Tannins are extracted from various plants and trees which can be classified according to their chemical properties as (a) hydrolyzable tannins, (b) condensed tannins, and (c) mixed tannins containing both hydrolyzable and condensed tannins. Tannins useful in the present invention include those that contain a tannin extract from naturally occurring plants and trees, and are normally referred to as vegetable tannins. Suitable vegetable tannins include the crude, ordinary or hot-water-soluble condensed vegetable tannins, such as Quebracho, mimosa, mangrove, spruce, hemlock, gabien, wattles, catechu, uranday, tea, larch, myrobalan, chestnut wood, divi-divi, valonia, summac, chinchona, oak, etc. These vegetable tannins are not pure chemical compounds with known structures, but rather contain numerous components including phenolic moieties such as catechol, pyrogallol, etc., condensed into a complicated polymeric structure.

In certain embodiments, the free acid comprises a phosphoric acid, such as a 100 percent orthophosphoric acid, superphosphoric acid or the aqueous solutions thereof, such as a 70 to 90 percent phosphoric acid solution.

In certain embodiments, the free acid is present in the coating composition in an amount ranging from 0.1 to 5.0 weight percent, such as 0.5 to 1.5 weight percent, based on weight of total resin solids present in the coating composition.

In certain embodiments, the coating compositions of the present invention are prepared as two package compositions with the polyester and free acid in one package and the material comprising at least two functional groups reactive with the hydroxyl groups of the polyester in the second package. In certain embodiments, the polyester is incorporated in a pigment containing grind paste.

In certain embodiments, the coating compositions of the present invention are formed from polymers that are liquid, that is, waterborne or solventborne systems. Suitable diluents include organic solvents, water, and/or water/organic solvent mixtures.

A number of optional conventional ingredients can be added to the coating compositions of the present invention such as pigments, rheology control agents, flow control agents, corrosion inhibitive pigments, adhesion promoters, such as alkoxysilanes, catalysts, cure retarders and fillers. In certain embodiments, a solvent or solvent blend is utilized to, for example, reduce the coating composition to an optimum spray viscosity. Examples of suitable reducing solvents include alcohols, ketones, aromatic hydrocarbons, glycol ethers, esters or mixtures thereof. In certain embodiments, a solvent blend is utilized, such as a blend of acetone, methyl amyl ketone and methyl isobutyl ketone. In certain embodiments, the solvent (or solvent blend) is present in amounts ranging from 5 to 80 weight percent based on total weight of the composition, such as 30 to 50 weight percent.

The coating compositions of the present invention can be applied to a variety of substrates by any of the conventional coating techniques such as, for example, brushing, spraying, dipping or flowing. Any of the known spray techniques can be employed such as compressed air spraying, electrostatic spraying including either manual or automatic methods. In certain embodiments, the coating composition is applied such that a dry film thickness in the range of 20 to 200 microns (0.8 mils to 8.0 mils) is obtained.

The present invention is also directed to methods of coating a substrate comprising (a) applying a coating composition of the present invention to at least a portion of the substrate; (b) coalescing the composition over the substrate in the form of a substantially continuous film; and (c) curing the composition.

The coating compositions can be applied by conventional methods over a wide variety of primed and unprimed substrates such as wood, metal, glass, cloth, leather, plastics, foams and the like. In certain embodiments of the present invention, the substrate is a metallic substrate. Examples of suitable metallic substrates can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL®, GALVALUME®, and GALVAN® zinc-aluminum alloys coated upon steel, and combinations thereof. Useful non-ferrous metals include aluminum, zinc, magnesium and alloys thereof. Combinations or composites of ferrous and non-ferrous metals can also be used.

In certain embodiments, a substrate is at least partially coated with a coating deposited from a coating composition of the present invention, wherein the coating is applied directly to the substrate. In another embodiment, the coating is applied directly to a metallic substrate.

Ambient temperature curable coating compositions, such as those using polyisocyanate or polyanhydride crosslinking agent, can be cured at elevated temperatures to hasten the cure. An example would be forced air curing in a down draft booth at 40° C. to 60° C. which is common in the automotive refinish industry. The ambient temperature curable coating compositions are usually prepared as a two (2) package system in which the crosslinking agent is kept separate from the polyester. The packages are combined shortly before application.

Thermally curable coating compositions, such as those using blocked isocyanate, aminoplast, phenoplast, or polyepoxide materials, can be prepared as a one package system. Such compositions are often cured at elevated temperatures, such as for 1 to 30 minutes at 250° F. to 450° F. (121° C. to 232° C.) with temperature primarily dependent upon the type of substrate used. Dwell time (i.e., time that the coated substrate is exposed to elevated temperature for curing) is dependent upon the cure temperature used as well as wet film thickness of the applied coating composition. For example, coated automotive elastomeric parts require a long dwell time at a lower cure temperature (e.g., 30 minutes at 250° F. (121° C.)), while coated aluminum beverage containers require a very short dwell time at a very high cure temperature (e.g., 1 minute at 375° F. (191° C.)).

Coatings formed from the coating compositions of the present invention can have superior chip resistance as compared to similar coatings that do not include a polyester comprising at least two reactive hydroxyl groups, as described earlier. Therefore, in certain embodiments, the particular reactants utilized to form the polyester are not critical, so long as the coating composition comprises: (a) a polyester comprising at least two reactive hydroxyl groups; (b) a material comprising at least two functional groups reactive with the hydroxyl groups of the polyester; and (c) a free acid. In these embodiments, however, the polyester is present in the composition in an amount sufficient to result in a coating having chip resistance improved when compared to a coating deposited at similar conditions from a similar coating composition that does not include the polyester.

As used herein, the term "chip resistance" refers to the ability of a coating to resist chipping caused by the impact of gravel or other flying objects. The chip resistance values reported herein are made primarily using the Velociball Test, and optionally, the Erichsen Test, as described in the Examples. As will be understood by those skilled in the art, the chip resistance of a coating can be affected by not only the coating composition itself but also the conditions under which the coating is deposited. As used herein, the term "deposited at similar conditions" means that two comparative coatings are deposited on the same or similar substrates at the same or similar film thicknesses. The skilled artisan will also appreciate that the chip resistance of a coating deposited from a thermosetting composition can be affected by cure conditions. As a result, at least in the case of thermosetting compositions, the term "deposited at similar conditions" also means that two comparative coatings are cured under similar cure conditions, such as cure temperature, humidity, and time. As used herein, the term "similar coating composition" means that a comparative coating composition contains the same components in the same or similar amounts as the composition to which it is being compared, except that the comparative coating composition does not include a polyester in an amount sufficient to result in a coating having improved chip resistance.

In certain embodiments, the coating compositions of the present invention are used as primer coating compositions for automotive refinish applications. The compositions can be applied directly to bare metal surfaces and, after being allowed to dry, coated directly with a pigmented topcoat composition or "color plus clear" topcoat system. In other embodiments, the compositions can be coated with any one of or all of the following optional layers, such as a primer, primer surfacer, and a sealer, followed by coating with a pigmented topcoat or color plus clear topcoat system. The coating compositions of the present invention can be used as a single primer or undercoat material beneath a topcoat, thereby potentially replacing up to three separate undercoats (corrosion inhibitive primer, primer-surfacer, and/or sealer) which have historically been required to obtain optimum results. As a result, the present invention is also directed to methods for refinishing the surface of an article, such as an article having a metal substrate. These methods of the present invention comprise the steps of: (a) removing a defect from the surface; (b) applying a first coating layer deposited from a composition comprising a coating composition of the present invention over at least a portion of the surface; and (c) applying a topcoat layer directly over at least a portion of the first coating layer (b).

The coating compositions of the present invention may form a single coating layer; or, in certain embodiments, the coating composition may form a layer of a multilayer coating. As a result, the present invention is also directed to multilayer coatings comprising (a) a first coating layer deposited from a composition comprising the coating composition of the present invention; (b) a second coating layer deposited over at least a portion of the first coating layer; and (c) a clearcoat layer deposited over at least a portion of the second coating (b). The second coating layer (b) and the clearcoat layer (c) may be formed from a curable coating composition. In certain embodiments, the first coating layer (a) comprises one or more pigments, and the second layer (b) comprises one or more pigments.

The present invention is more particularly described in the following examples, which are illustrative only. All quantities, percentages and ratios are on a weight basis unless otherwise indicated.

EXAMPLES

Example 1

Example 1 illustrates the preparation of a polyester suitable for use in the coating compositions of the present invention.

A reaction vessel equipped with stirrer, thermocouple, and condenser with Dean-Stark trap and nitrogen inlet was charged with 1950.0 g TERATHANE® 650 (available from DuPont) and 192.0 g of trimellitic anhydride and heated to a temperature ranging from 185° C. to 200° C. Water was removed until the acid value of the reaction was less than 6 mg KOH per gram. Then, the reaction contents were cooled to 160° C. and any remaining water was removed by vacuum distillation.

The final polyester product had a solids content of 100 weight percent as measured for one hour at 110° C.; an acid value of 5.5 mg KOH per gram; a hydroxyl number of 85.6 mg KOH per gram; a water content of 0.02%; and a Gardner-Holt viscosity of Z3-Z4.

Examples 2 through 7

The following coating compositions (Examples 2 through 7) were prepared, the components of which are listed by weight in Table 1. The numbers in parenthesis represent resin solids by weight for those materials. All examples were prepared by mixing the components under mild agitation in the order of Table 1. The "Crosslinker Pack" was co-blended with the "Resin Pack" also just prior to spray application.

TABLE 1

| | Example | | | | | |
|---|---|---|---|---|---|---|
| | 2 | 3 | 4 | 5 | 6 | 7 |
| "Resin Pack" | | | | | | |
| P565-3015[1] | 33.44 | 33.44 | 33.44 | 33.44 | 33.44 | 33.44 |
| Acrylic Resin[2] | 33.4 (16.7) | 33.4 (16.7) | 12.0 (6.0) | 12.0 (6.0) | 12.0 (6.0) | 12.0 (6.0) |
| P100-2020[3] | — | — | 17.36 (10.7) | 17.36 (10.7) | — | — |
| Polyester of Example 1 | — | — | — | — | 10.7 (10.7) | 10.7 (10.7) |
| Acetone | 10.5 | 10.5 | 10.5 | 10.5 | 10.5 | 10.5 |
| D 872[4] | 8.2 | 8.2 | 8.2 | 8.2 | 8.2 | 8.2 |
| D 871[5] | 10.4 | 10.4 | 10.4 | 10.4 | 10.4 | 10.4 |
| Dibutyl Tin Dilaurate solution[6] | 0.8 | 0.8 | 0.8 | 0.8 | 0.8 | 0.8 |
| Tannic Acid Solution[7] | — | 3.1 | — | 3.1 | — | 3.1 |
| "Crosslinker Package" | | | | | | |
| DCX 8[8] | 8.77 | 8.77 | 8.77 | 8.77 | 8.77 | 8.77 |

[1] P565-3015, Nexa Autocolor Fast HS Wet-on-Wet Sealer from PPG Industries, Inc., Pittsburgh, PA.
[2] Acrylic Resin, formed from hydroxyethyl methacrylate, 2-ethylhexyl acrylate, methyl methacrylate and acrylic acid (22/15/63/1 weight ratio) at 50% solids in xylene and n-butyl acetate (50/50 weight ratio).
[3] P100-2020, Nexa Autocolor Flexible Additive available from PPG Industries, Inc., Pittsburgh, PA.
[4] D872, Global Slow Thinner available from PPG Industries, Inc., Pittsburgh, PA.
[5] D871, Global Medium Thinner available from PPG Industries, Inc., Pittsburgh, PA.
[6] 10% Dibutyl tin dilaurate by weight in methyl isobutyl ketone. Dibutyl tin dilaurate is a tin catalyst available from Air Products & Chemicals, Inc., Allentown, PA.
[7] 10% tannic acid by weight in a solvent blend of 60% methyl ethyl ketone, 30% ethanol, 10% xylene by weight.
[8] DCX8, High Solids Hardener available from PPG Industries, Inc., Pittsburgh, PA.

The compositions of Examples 2 through 7 were hand spray applied onto 4×12 inch panels of type APR18661 (unsanded galvanized steel cold roll steel) available from ACT Laboratories, Inc. A first pass was sprayed, followed by a five (5) minute ambient flash, then a second pass was sprayed. The applied coating was allowed to cure at ambient conditions for thirty (30) minutes.

Next, a basecoat layer was hand spray applied over the coating compositions of Examples 2 through 7. The black basecoat was Global D9700, available from PPG Industries, Inc. The black basecoat was blended with D871 (Medium Reducer, available from PPG Industries, Inc.) and applied and cured as per the instructions on the technical data sheet.

Next, a clearcoat layer was applied over the basecoated panels. The clearcoat was prepared by mixing DCU2042 (Low VOC Speed Clear available from PPG Industries, Inc.) with DCX61 (High Solids Hardener, available from PPG Industries, Inc.) and reduced with DT885 (Reducer, available from PPG Industries, Inc.) at a volumetric ratio of 4 to 1 to 1. The clearcoat layer was applied and allowed to cure at ambient conditions for 7 days prior to testing.

Each coated panel was chip tested using the Velociball Test and the Erichsen Test as described below.

To perform the Velociball Test, the coated panels were placed onto a test stand located inside a freezer set at −20° C. The panels were allowed to equilibrate for a minimum of 2.5 hours to ensure they had reached the temperature setpoint. The panels were at a distance of about 40 inches from the ball firing mechanism. The remaining panels were left in the freezer until tested.

A total of four (4) sets of chrome steel bearing balls, each set containing four (4) balls, were fired at each panel. This yielded a total of sixteen (16) shots on each panel. The diameter of the balls used in the test included both 2 mm and 3 mm (Part #9292K31 and Part #9292K33 respectively from McMaster Carr).

First, one set of four (4) balls was fired at the coated panel simultaneously. Air pressure of the instrument was adjusted to obtain the desired ball velocity set forth below. The set included:

Ball #1: One 3 mm ball fired at a velocity within the range of 155 mph (miles per hour)

Ball #2: One 3 mm ball fired within the range of 95 mph

Ball #3: One 3 mm ball fired within the range of 75 mph

Ball #4: One 2 mm ball fired within the range of 155 mph

The resulting impact marks were located underneath one another as opposed to side by side. Next, the second through fourth sets of balls were fired at the panel in the same manner as the first set. After testing, each coated panel had four (4) impact sites Ball #1; four (4) impact sites from Ball #2; four (4) impact sites from Ball #3; and four (4) impact sites from Ball #4. Each panel was removed from the apparatus. Any raised or bubbled areas of paint at the impact sites were carefully removed using a Henry Shein Root Tip Pick part no. 100-2518.

Each panel was rated by measuring the diameter (mm) of each circular impact area using a digital caliper. Each measurement was converted to surface area using the equation:

$$\text{Surface Area} = \pi r^2$$

wherein, r represents radius of a circle (½ the measured diameter). The average surface area was calculated from the four (4) impact sites generated by each Ball. These results are shown in Table 2. The smaller the surface area, the better the chip resistance.

To perform the Erichsen Test, each coated panel was clamped into the Erichsen Stone Hammer Blow Testing Instrument, Model 508 (available from Erichsen GmbH & Co KG, Am Iserbach 14, D-58675 Hemer). This test was performed at ambient conditions. The media used to fire at each panel was 2500 grams of Diamant Chilled Iron Grit (4 to 5 mm diameter) available from Eisenwerke Wurth GmbH, Possfach 1155, 74173 Bad Friedrichshall. The media was fired at the panel using compressed air at a pressure of 45 psi.

Each panel was rated by comparing it to the Ford FLTM B1 157-04 High Performance Stone Chip Test standard. The values generated from this comparison are shown in Table 2. The higher the value, the better the chip resistance.

TABLE 2

| | Velociball Results | | | | |
|---|---|---|---|---|---|
| Example | 3 mm @ 155 mph | 3 mm @ 95 mph | 3 mm @ 75 mph | 2 mm @ 155 mph | Erichsen Results |
| 2 | 180 | 195 | 90 | 120 | 0 |
| 3 | 46 | 32 | 28 | 30 | 3 |
| 4 | 186 | 145 | 62 | 72 | 0 |
| 5 | 40 | 26 | 16 | 18 | 3 |
| 6 | 102 | 82 | 40 | 52 | 3 |
| 7 | 14 | 6 | 4 | 8 | 7 |

Whereas particular embodiments of this invention have been described above for purposes of illustration, it will be evident to those skilled in the art that numerous variations of the details of the present invention may be made without departing from the invention as defined in the appended claims.

Therefore, we claim:

1. A method of coating a bare metal substrate comprising:
   (a) applying a composition comprising a coating composition directly to at least a portion of the bare metal, substrate;
   (b) coalescing the composition over the substrate in the form of a substantially continuous film; and
   (c) curing the composition;
   wherein the coating composition comprises:
   (a) a polyester comprising at least two reactive hydroxyl groups, wherein the polyester comprises the reaction product of reactants comprising:
      (i) a polycarboxylic acid comprising more than two acid groups per molecule, and
      (ii) polytetramethylene glycol having a hydroxyl number between 50 and 500 mg. KOH per gram;
   the molar ratio of (ii) to (i) being at least 2.5 to 1;
   (b) a material comprising at least two functional groups reactive with the hydroxyl groups of the polyester; and
   (c) 0.1 to 5 percent by weight based on total resin solids weight of a free acid.

2. The method of claim 1, wherein the coating composition further comprises a polymer different from the polyester the weight ratio of the polyester to the polymer being 60:40.

3. The method of claim 2, wherein the polymer comprises functional groups reactive with the functional groups of component (b).

4. The coating composition of claim 1, wherein the polycarboxylic acid comprises trimellitic acid, trimellitic anhydride, or a mixture thereof.

5. The method of claim 4, wherein the polycarboxylic acid comprises trimellitic anhydride.

6. The coating composition of claim 1, wherein the free acid (c) is selected from tannic acid, gallic acid, phosphoric acid, phosphorous acid, citric acid, malonic acid, a derivative thereof, or a mixture thereof.

7. A substrate at least partially coated in accordance with claim 1.

8. A method of refinishing a surface of an article comprising a bare metal substrate comprising:
   (a) removing a defect from the surface;
   (b) applying a first coating layer deposited from a coating composition directly to at least a portion of the surface of the bare metal substrate; and
   (c) applying a topcoat layer over at least a portion of the first coating layer (b);
   wherein the coating composition comprises:
   (a) a polyester comprising at least two reactive hydroxyl groups, wherein the polyester comprises the reaction product of reactants comprising:
      (i) a polycarboxylic acid comprising more than two acid groups per molecule, and
      (ii) polytetramethylene glycol having a hydroxyl number between 50 and 500 mg. KOH per gram;
   the molar ratio of (ii) to (i) being at least 2.5 to 1;
   (b) a material comprising at least two functional groups reactive with the hydroxyl groups of the polyester; and
   (c) 0.1 to 5 percent by weight based on total resin solids weight of a free acid.

9. The method of claim 8, wherein the article comprises an automobile part.

10. A method for improving chip resistance of a coated substrate comprising:
    (a) applying a composition comprising a coating composition directly to at least a portion of a bare metal substrate;
    (b) coalescing the composition over the substrate in the form of a substantially continuous film; and
    (c) curing the composition;
    wherein the coating composition comprises:
    (a) a polyester comprising at least two reactive hydroxyl groups, wherein the polyester comprises the reaction product of reactants comprising:
       (i) a polycarboxylic acid comprising more than two acid groups per molecule, and
       (ii) polytetramethylene glycol having a hydroxyl number between 50 and 500 mg. KOH per gram;
    the molar ratio of (ii) to (i) being at least 2.5 to 1;
    (b) a material comprising at least two functional groups reactive with the hydroxyl groups of the polyester; and
    (c) 0.1 to 5 percent by weight based on total resin solids weight of a free acid.

* * * * *